July 15, 1952 R. H. BRAKE 2,603,673
SWITCH MEANS
Filed Oct. 4, 1949

INVENTOR.
Richard H. Brake
BY
Moore, Olson & Trexler
attys

Patented July 15, 1952

2,603,673

UNITED STATES PATENT OFFICE 2,603,673

SWITCH MEANS

Richard H. Brake, Rawlins, Wyo.

Application October 4, 1949, Serial No. 119,479

6 Claims. (Cl. 171—97)

This invention is concerned with a single safety switch circuit for use either in conjunction with a source of electrical power and a primary and secondary load which will automatically connect the second load upon failure of the first and in which either load may be energized independently and automatically isolated from the other, or in conjunction with a single load and primary and secondary sources of power for analogous operation.

There are many applications in aircraft and marine use as well as railroads, industrial and other uses in which the failure of an electric circuit can lead to great inconvenience or disaster. A common example is found in the automobile wherein the failure of the headlights through a short or open circuit makes it immediately impossible for the driver to ascertain his whereabouts or for oncoming cars to locate the automobile with any degree of facility. To prevent a crash, it is necessary that auxiliary lights should be energized immediately upon failure of the main headlights. Previous electromechanical devices which have been constructed in an attempt to solve this problem have often made it impossible to energize the auxiliary lights other than through failure of the main headlights. This is undesirable as auxiliary lamps must be provided which have no purpose other than to function as safety lights and are almost always idle. There have also been circuits which provide manual switching means so that the main headlights and auxiliary lamps may be alternatively energized so that parking lamps or the like or additional filaments in the main headlights may be utilized as auxiliary lights rather than using separate lamps serving only this purpose. There are, however, times when it is desirable to energize both the main headlights and the auxiliary lights, such as when fog lights are used either as main or auxiliary lights and it is desired to use parking lights or headlights concurrently therewith as position indicators or to cope best with changing conditions of fog.

An important object of this invention is to provide a switching circuit which upon failure of a main electrical load will connect an auxiliary load in its place automatically and in which the main and auxiliary loads may be operated independently.

If an interconnection between the main and auxiliary load circuits, such as the headlights and parking lights or the like of an automobile, is established at all times except when the main load is energized and is in proper operating condition, it is manifest that independent energization of the auxiliary load would energize the main load and could damage the interconnection or other parts of the circuit.

It is accordingly an object of this invention to provide switching means which automatically connect an auxiliary electrical load upon failure of a main electrical load wherein the auxiliary load may be independently energized and in which the interconnection between the main and auxiliary loads is disconnected automatically by independent energization of the auxiliary load.

In hospitals, airports and industrial plants it is imperative that in the event of a power failure an emergency source of power should be connected to the load circuit as quickly as possible to keep lights burning and machinery operating. Often when additional power is required for a short time, or for other reasons it may be desirable to connect the auxiliary or emergency power source to the load concurrently with the main power source and during periods of light load or under other circumstances, it may be desirable to utilize the auxiliary source of power independently of the main source. It is desirable to provide an electrical interconnection between the main and auxiliary sources of power which is disconnected upon independent energization of the auxiliary source to prevent interaction between the main and auxiliary power sources and possible damage to the interconnection or other circuit components.

Another object of this invention is the provision of a switching circuit to connect an auxiliary source of power automatically in place of a main source, concurrently with a main source, or instead of a main source with the interconnection between the auxiliary and main sources opened by use of the auxiliary source.

Although the last enumerated object appears to be substantially the opposite of the other objects of this invention, namely the provision of a switching circuit for use with a single source of power to connect an auxiliary load automatically in place of a main load concurrently therewith or in place of the main load with the energization of the auxiliary load automatically disabling the interconnection between the main and auxiliary loads, I have found that a single, simple circuit will efficaciously perform all of these objects by merely reversing the connections.

Accordingly, a very important object of the present invention is the provision of a single switching circuit which will satisfy all of the foregoing objects.

Other and further objects and advantages of the present invention, as well as means for carrying out the objects listed, will be apparent from the following description when taken in conjunction with the accompanying drawings in which.

Figure 1:
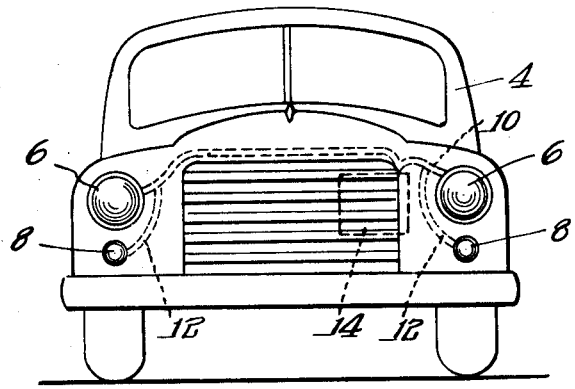
Figure 1 shows my invention as installed in an automobile.

In Figure 1 my invention is illustrated as installed in an automobile 4 having headlights 6 and parking lights 8. Cables 10 and 12 connect the headlights and parking lights respectively with a housing 14 enclosing most of my switching circuit.

Figure 2:
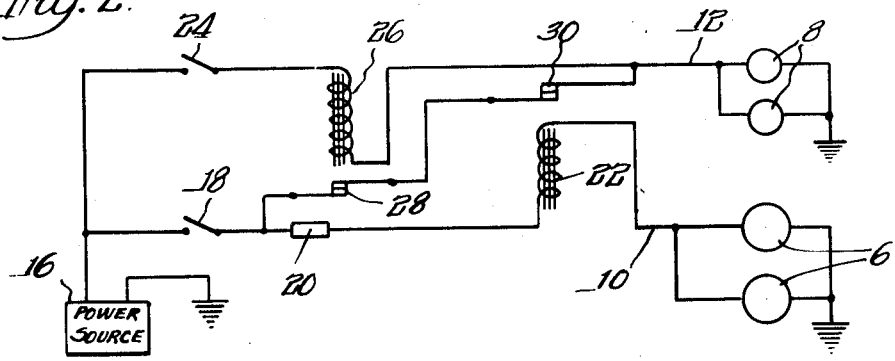
Figure 2 shows my switching circuit connected between a single source of power and main and auxiliary load circuits.

The switching circuit itself is shown in Figure 2 and is connected to a power source 16, which in an automobile would be a storage battery, the other terminal of which is grounded. A manual switch 18 which could be located conveniently on the instrument panel is connected to the power source 16 and through a fuse or circuit breaker 20 in series with a relay coil 22 and through the cables 10 to the headlights 6. The circuit which may be termed the main circuit is completed by grounding of the headlights. An additional manual switch 24 which may also be located on the instrument panel is also connected to the power source 16 and to a relay coil 26 which is connected in turn through the cables 12 to the grounded parking lights 8 to constitute an auxiliary circuit. Although parking lights are referred to, it is apparent that the connection could be made to secondary filaments in the headlights, to fog lights, or to any other auxiliary lights. An interconnection between the main and auxiliary circuits is provided from a junction between the switch 18 and fuse 20 through normally closed relay contacts 28 openable by the relay coil 26 and normally closed relay contacts 30 openable by the relay coil 22 to a point between the relay coil 26 and the cables 12. When the main headlights are energized by closing the switch 18, the relay coil 22 opens the contacts 30 to isolate the cables 12 and auxiliary lamps 8 from the power source and from the main circuit. If the fuse 20 should burn out or if an open circuit should occur in the main circuit, the relay coil 22 would be de-energized. The same result would be reached by a short circuit, as this would cause the fuse 20 to burn out. Upon de-energization of the relay coil 22, the auxiliary lamps 8 are immediately energized by closing of the contacts 30. If it is desired to energize the parking lights 8 without energizing the headlights 6, the manual switch 18 is opened and the manual switch 24 is closed. This establishes a circuit through the relay coil 26 to open the contacts 28. Opening of the contacts 28 prevents energization of the headlights 6 from the interconnection and also prevents damage to the interconnection and other parts of the circuit should there be a fault in the main circuit. If it is desired to operate the headlights 6 and the auxiliary or parking lamps 8 concurrently, both manual switches 18 and 24 may be closed. Both relay coils 26 and 22 are thus energized and the contacts 28 and 30 are opened so that the main and auxiliary circuits are entirely independent and are isolated from one another.

It is to be understood that the two parking lights are not necessarily connected in parallel nor are the two headlights. Individual circuits may be provided for each headlight and associated auxiliary light rather than for each pair, as illustrated, and the switching circuit may be used in applications other than automotive.

Figure 3:
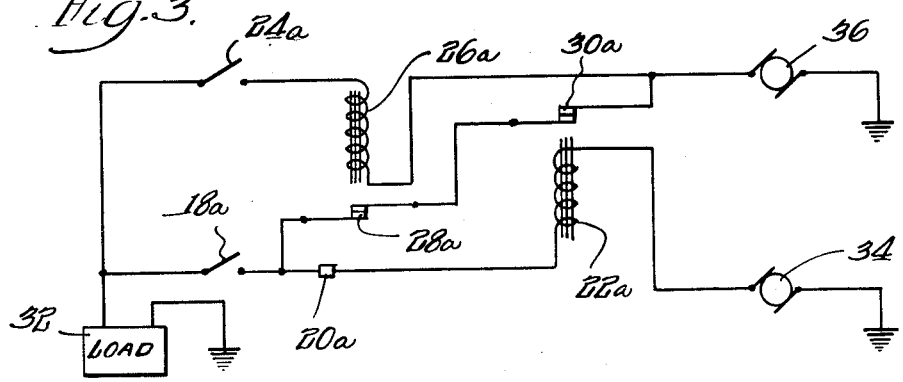
Figure 3 shows my circuit as connected between a single load and main and auxiliary source of power.

In Figure 3 a switching circuit identical with that shown in Figure 2 is shown with the connections reversed to supply a single load 32 from a main source, illustrated as a generator 34, or an auxiliary source 36. One terminal of the load and of each source is grounded, and the circuit from the main source 34 is completed through a main circuit constituting manual switch 18a, fuse 20a and relay coil 22a. The auxiliary circuit from the auxiliary source 36 is completed by a manual switch 24a and a relay coil 26a. Normally closed relay contacts 28a and 30a provide an interconnection between the main and auxiliary circuits in a manner identical with that illustrated in Figure 2. When the switch 18a is closed to complete the circuit from the main power source 34, the relay coil 22a is energized to open the contacts 30a to prevent any interaction between the circuits. Should the fuse 20a burn out through a short circuit or other over-load or should an open circuit otherwise occur in the main circuit, the relay coil 22a is de-energized immediately to allow the contacts 30a to close to supply the load from the auxiliary source 36. The auxiliary source can be used independently of the main source by opening the switch 18a and closing the switch 24a. This energizes the relay coil 26a to open the contacts 28a and isolate the main circuit from the auxiliary circuit. Additionally, both the main and auxiliary sources of power 34 and 36 may be used concurrently by closing both manual switches 18a and 24a, which causes the relay contacts 28a and 30a to open to render the main and auxiliary circuits entirely independent and isolated from one another.

Although I have shown and described certain preferred embodiments of my invention, it is to be understood that this is for illustrative purposes only and that my invention is to be limited only by the spirit and scope of the appended claims.

I claim:

1. The combination comprising electrical energy supplying means, electrical energy absorbing means, first circuit means including first switch means and a first relay coil interconnecting said energy supplying means and said energy absorbing means, second circuit means including second switch means and a second relay coil interconnecting said energy supplying means and said energy absorbing means, and means interconnecting said first and second circuit means including normally closed relay contacts openable by load current through either relay coil substantially to isolate said first and second circuit means.

2. The combination comprising electrical energy supplying means, electrical energy absorbing means, first circuit means including first manual switch means and first switch operating means interconnecting said energy supplying means and said energy absorbing means, second circuit means including second manual switch means and second switch operating means interconnecting said energy supplying means and said energy absorbing means; and means selectively interconnecting said first and second circuit means including normally closed switch means operable by load current through either switch operating means, said switch means electrically interconnecting said first and second circuit means when opened and substantially isolating said first and second circuit means when closed.

3. The combination comprising a source of electrical potential, a first load, a second load, first circuit means including first switch means and first switch operating means interconnecting said source and said first load, second circuit means including second switch means and second switch operating means interconnecting said source and said second load, and means interconnecting said first and second circuit means including normally closed switch means openable by load current through either switch operating means substantially to isolate said first and second circuit means.

4. The combination comprising a first source of electrical potential, a second source of electrical potential, a load, first circuit means including first manual switch means and first switch operating means interconnecting said first source and said load, second circuit means including second switch means and second switch operating means interconnecting said second source and said load, and means interconnecting said first and second circuit means including normally closed switch means openable by load current through either switch operating means substantially to isolate said first and second circuit means.

5. The combination comprising a source of electrical potential, a first load, a series-connected first circuit means including first manual switch means and a first relay coil between said source and said first load, a second load, series-connected second circuit means including second manual switch means and a second relay coil between said source and said second load, and means including a plurality of normally closed series-connected relay contacts selectively interconnecting said first and second circuit means and operable by load current through said first or second relay coils, said relay contacts electrically interconnecting said first and second circuit means when closed and substantially isolate said first and second circuit means when opened.

6. The combination claimed in claim 5 in which the interconnection provided by the plurality of normally closed series-connected relay contacts is from the junction between said first manual switch and said first relay coil to the junction between said second relay coil and said second load.

RICHARD H. BRAKE.

REFERENCES CITED

The following references are of record in the file of this patent:

UNITED STATES PATENTS

| Number | Name | Date |
| --- | --- | --- |
| 1,956,980 | Cook | May 1, 1934 |
| 2,427,076 | Tabacchi | Sept. 9, 1947 |